Sept. 2, 1924.  
W. TAYLOR  
1,506,954  
MOVEMENT MAGNIFYING MECHANISM OF GAUGES AND LIKE MEASURING INSTRUMENTS  
Filed Jan. 2, 1920   2 Sheets-Sheet 1
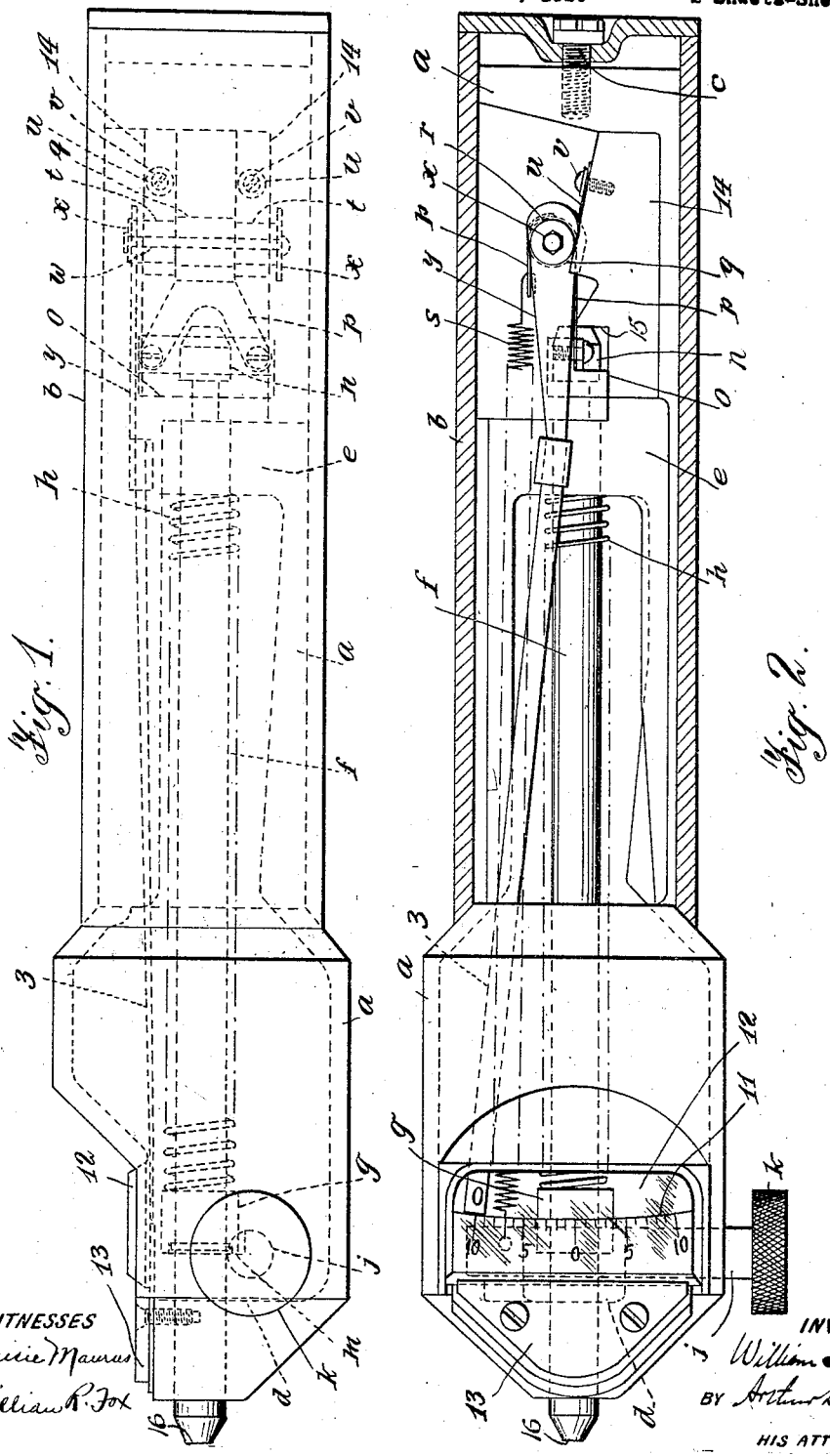

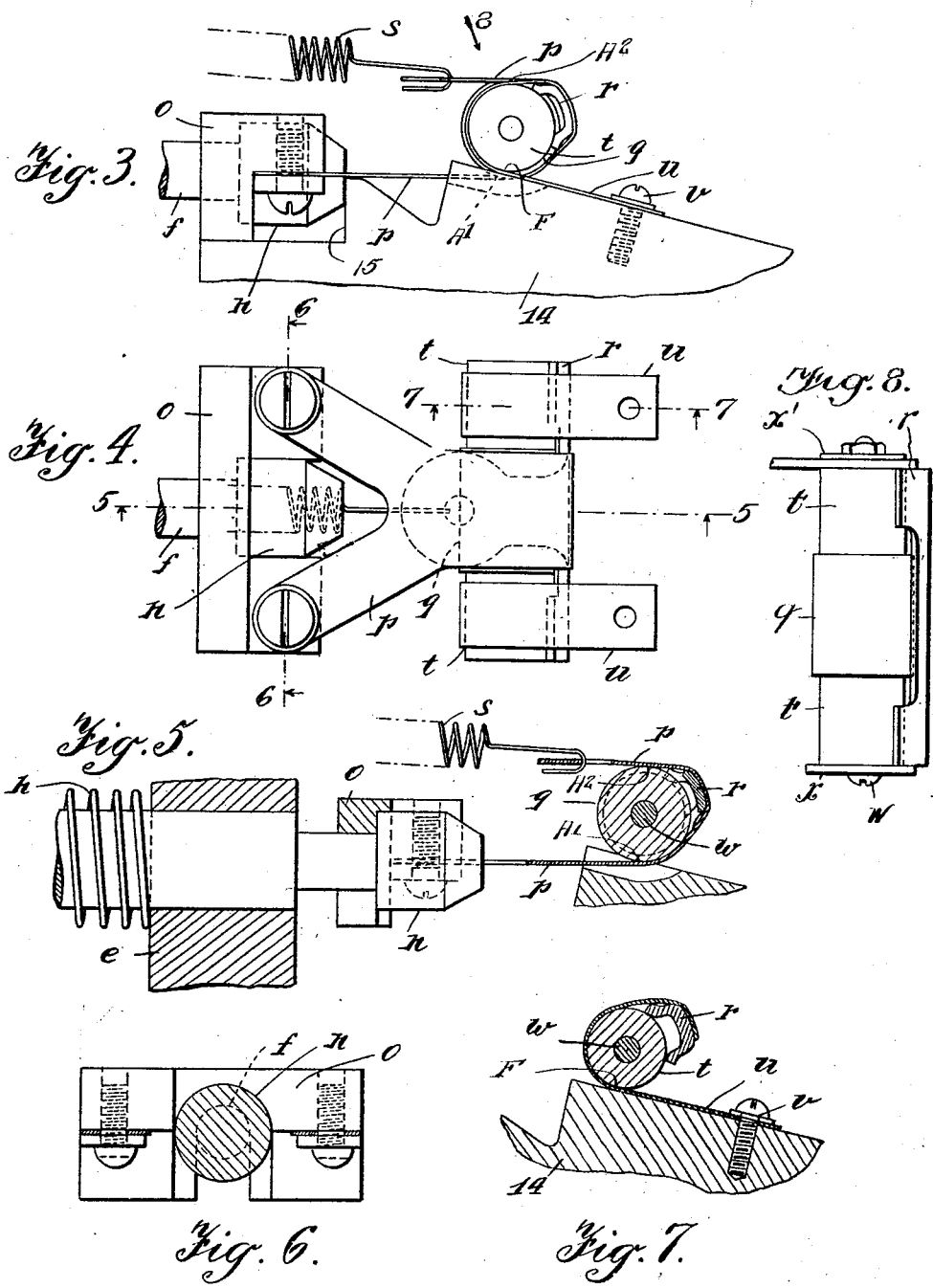

Patented Sept. 2, 1924.

1,506,954

UNITED STATES PATENT OFFICE.

WILLIAM TAYLOR, OF LEICESTER, ENGLAND.

MOVEMENT-MAGNIFYING MECHANISM OF GAUGES AND LIKE MEASURING INSTRUMENTS.

Application filed January 2, 1920. Serial No. 349,111.

*To all whom it may concern:*

Be it known that I, WILLIAM TAYLOR, of Stoughton Street Works, Leicester, England, a subject of the King of Great Britain, have invented certain new and useful Improvements in the Movement-Magnifying Mechanism of Gauges and like Measuring Instruments, of which the following is a specification.

This invention relates to apparatus for magnifying small movements, for example, of a gauging or measuring point, or the like, and has for its principal object to provide an improved form and construction of such apparatus. A further object of the invention is to provide improved apparatus for engineers' use in measuring or comparing gauges and the like.

Mechanism constructed in accordance with this invention comprises, a roller having parts of different diameters, means tending to turn said roller, flexible bands attached each by one end to said parts of different diameters, respectively, so as to wind on said parts from opposite directions, the opposite ends of said bands being fixed respectively the one to a supporting frame and the other to the object the movement of which is to be magnified, the bands being so disposed as to be put in tension by said turning means in turning the roller.

The accompanying drawings illustrate one form of apparatus embodying this invention and adapted for engineers' use in measuring or comparing gauges and the like.

Figure 1 is a side elevation and Figure 2 a part sectional plan view of the complete instrument;

Figures 3 and 4 are respectively a plan and a side elevation of the roller and bands on a larger scale, the bolt, washers and arm being omitted in these views for the sake of greater clearness;

Figures 5, 6 and 7 are sections taken on the lines 5—5, 6—6 and 7—7, respectively, in Figure 4; and Figure 8 is a view of the roller taken in the direction indicated by the arrow 8 in Figure 3 showing the bolt, washers, saddle piece and arm, the bands being omitted for the sake of greater clearness.

In this form of the apparatus a hollow frame $a$ has a cylindrical stem $b$, which is conveniently formed as a tube sliding over part of the frame $a$ to enclose the principal working parts or give access to them, and is secured to said frame by a screw $c$ at the end thereof. The instrument may be held by this stem in the socket of a machine or other apparatus.

Sliding in bearings in lugs $d$, $e$, on the frame $a$ is a bar $f$, the outer end of which projects from the frame $a$ and serves as the gauging point 16 of the instrument. A collar $g$ pinned to the bar $f$ receives the thrust of a compression spring $h$, the other end of which thrusts against the lug $e$, thus tending to advance the measuring point of the bar $f$ to the left, Figures 1 and 2. A shaft $j$ provided with a knurled knob $k$ is journaled transversely within the frame $a$ and is cut away so as to provide a shoulder $m$, Figure 1, which engages the collar $g$ so as to enable the bar $f$ to be forced back to the right, Figures 1 and 2, against the action of the spring $h$ to facilitate the placing of the object to be measured under the measuring point of the bar $f$. The other end of the bar $f$ is formed with a head $n$ and movement of the bar $f$ to the right is restricted by an abutment 15 against which the head $n$ will bear when the bar $f$ is in its extreme position on to the right. Behind the head $n$ is disposed a suitable recessed crosshead $o$ to which, in an axial plane of the bar $f$, are attached the ends of the branches of a Y-shaped band $p$ the other end of which band bends round the central part $q$ of a roller, is attached to a saddle piece $r$ disposed longitudinally of said roller, and finally is attached to a light tension spring $s$ attached to the frame $a$. The central part $q$ of the roller is slightly larger in diameter than its end parts $t$, $t$ and over these latter parts $t$, $t$ are bent two bands $u$, $u$ each attached at one end to the saddle piece $r$ and at the other end to the frame $a$ by screws $v$, $v$. The arrangement is such that the spring $s$ maintains the bands $p$, $u$, $u$ in tension, and when any displacement of the bar $f$ occurs, it causes the roller $q$, $t$, $t$ to be turned through an angle which depends not only upon the extent of the displacement of the bar $f$ but also upon the relative radii of the central part $q$ and the end parts $t$, $t$ of the roller. By arranging that the stresses in the bands $p$, $u$, $u$ are well below their elastic limits, it is practicable to get the arrangement free from all backlash, and as it is free from sliding friction great sensitiveness is secured.

Clamped to the roller $q, t, t$ by means of a bolt $w$ and washers $x, x'$ is an arm $y$ to which is secured a pointer 3 adapted to move about a graduated scale 11 fixed to the frame $a$. The scale 11 is protected by a transparent window 12 conveniently seated in a dovetailed groove and held therein by a plate 13 screwed to the frame $a$.

The saddle piece $r$ to which the bands $p, u, u$ are attached is clamped between the washer $x$ and the inner end of the arm $y$ as most clearly shown in Figure 8 in order to retain the saddle piece in position upon the roller $q, t, t$. By loosening the bolt $w$ the saddle piece $r$ may be adjusted circumferentially about the roller.

In order to give to the roller $q, t, t$ greater stability than it would have if the bands $u, u$ lay in an axial plane of the bar $f$, seatings 14, 14 inclined at a small angle to said plane, are provided on the frame $a$, as shown, and the bands $u, u$ are caused to lie on said seatings 14, 14 under the pressure from the roller $q, t, t$ due to the tension in the bands.

The bands $u, u$ may be regarded as constituting in effect one band, since their functions are the same, but by employing two a symmetrical arrangement is obtained and even distribution of stress in the bands is promoted; this particular arrangement is not, however, essential.

For the purpose of adjusting the instrument in the course of manufacture so that the readings on the scale 11 may be correct in spite of variations in component parts, for example in the diameters of the roller, the central part $q$ of the roller may be slightly eccentric to its two ends $t, t$ so that, by loosening the bolt $w$ the roller may be turned within the bands $p, u, u$ and the saddle piece $r$ adjusted circumferentially of the roller so as to vary the distance between the surface of the central part $q$ and the part of the surface of the end parts $t, t$ which contact with the portions of the bands $u, u$ which are resting upon the seatings 14, 14.

The mechanism described affords a means for measuring minute movements of the gauging point 16 of the bar $f$ relative to the frame $a$ by readings of the position of the pointer 3 upon the scale 11. A slight movement of the gauging point 16 relative to the frame results in a relatively very large movement of the end of the pointer 3 upon the scale 11. This results from the operation of the roller $q, t, t$ and the bands $p, u, u$. As the rolling movement of the roller upon the portion of the bands $u$ seated upon the inclined seats 14 is very slight, the roller is in effect a lever fulcrumed at the points of contact F of the surfaces $t, t$ with the portions of the bands $u, u$ which lie upon the inclined seats 14, 14 (Fig. 3). The bands $u, u$ restrain movement of the fulcrum point toward the left and balance the pull of the upper and lower portion of the band $p$ upon the roller. Still regarding the roller as a lever, it is apparent that the length of the arm of the lever to which movements of the bar $f$ are applied by the lower portion of the band $p$ is equal to the distance from the fulcrum point F of the lever to the point A' on the surface of the portion $q$ of the roller at which the lower portion of the band $p$ is tangential to this surface, or to be strictly accurate, to the projection of this distance upon a plane perpendicular to the lower portion of the band $p$. The length of this arm is thus approximately equal to the difference in radius between the part $q$ and the parts $t, t$ of the roller, but is dependent also upon the angle between the lower portion of the band $p$ and the portions of the bands $u, u$ which lie on the seats 14, 14. This angle is dependent upon the angle between the axis of the bar $f$ and the surface of the seats 14, 14 and also upon the position of the roller upon the seats. The length of the arm of the lever to which the force of the spring $s$ upon the upper portion of the band $p$ is applied is equal to the distance from the fulcrum point F to the point $A^2$ on the surface of the portion $q$ of the roller at which the upper portion of the band $p$ is tangential to this surface, or strictly to the projection of this distance upon a plane perpendicular to the upper portion of the band $p$. This distance is approximately equal to the diameter of the portion $t$ plus the difference in radius between the portion $q$ and the portions $t$. It is apparent, therefore, that slight movements of the lower portion of the band $p$ acting upon the short arm of the lever will result in relatively large movements of the upper portion of the band $p$ acting upon the long end of the lever. The movement is, however, not measured by the displacement of the upper portion of the band $p$, but a further magnification is obtained by use of the long pointer 3. The right-hand end of this pointer is rigidly attached at the center of the roller, so that angular movement of the pointer as the roller turns about the fulcrum point F will be the same as if the pointer 3 projected upwardly from the center of the roller away from its fulcrum point. Thus considering the pointer 3 as a part of the lever formed by the roller $q, t, t$, it is seen that the length of the lever arm to which motions of the bar $f$ are applied, comprises as already stated the projection upon a plane perpendicular to the lower portion of the band $p$ of the distance F A', or approximately the difference in radius between the portions $t, t$ and the portion $q$, while the length of the arm of the lever which determines the movement of the end of the pointer 3 is substantially equal to the radius of the portion $t$ plus the length of the pointer 3. The difference between the length of these arms determines the ratio of magnification obtained which in the mechanism described may easily be made as high as 500 to 1.

It will be noted that the operation of the roller in causing this magnification would be the same if the band $p$ were used in connection with only one of the bands $u$. In this case, however, the pull of the band $p$ and one band $u$ on the roller would tend to swing the axis of the roller around. It is thus apparent that one of the bands $u$ may be regarded as cooperating with the band $p$ and the roller to cause the magnification, while the other band may be regarded as having the function of counterbalancing the tendency of these two bands to turn the axis of the roller.

By the means described therefore, magnifying mechanism is produced which may have a ratio so high as, for example, 500 to 1, which is without sliding motion in its vital parts, without friction or backlash, and requires no lubrication. Such a frictionless high ratio lever is obviously applicable to many uses in measuring and recording instruments, for example in barographs, and is not restricted to the example described and illustrated.

I claim:—

1. Movement magnifying mechanism, comprising the combination with an object the movement of which is to be magnified and a supporting member, of a roller having parts of different diameters, means tending to turn said roller, and flexible bands attached to the roller so as to wind on said parts of different diameter respectively and from opposite directions, the bands being so disposed as to be put in tension by said turning means and being attached, respectively, one to the supporting member, and the other to the object the movement of which is to be magnified.

2. Movement magnifying mechanism, comprising the combination with an object the movement of which is to be magnified and a fixed support, of a roller having parts of different diameters, a flexible band having one of its ends attached to the fixed support and the other of its ends attached to said roller so as to wind on one of the parts of said roller, and a second flexible band having one of its ends attached to the object the movement of which is to be magnified, said band passing around the other of the parts of said roller and being attached to the roller, and a spring tending to turn the roller so as to put said bands in tension.

3. Movement magnifying mechanism, comprising the combination with an object the movement of which is to be magnified and a supporting member, of a roller having two end parts of equal diameter and a central part of different diameter, means tending to turn said roller, a flexible band attached to the roller so as to wind on the central part thereof from one direction, and a pair of flexible bands attached to the roller so as to wind the end portions thereof from the opposite direction, said band and said pair of bands being so disposed as to be put in tension by said turning means and being attached, respectively, the one to the supporting member, and the other to the object the movement of which is to be magnified.

4. Movement magnifying mechanism, comprising a frame, a bar slidable in said frame, a roller having parts of different diameters, means tending to turn said roller, and flexible bands attached to said roller so as to wind on said parts of different diameters, respectively, from opposite directions, the bands being so disposed as to be put in tension by said turning means, one of said bands lying substantially parallel to the direction of motion of said bar and being attached to the bar, and the other of said bands being inclined to the direction of motion of said bar and being attached to said frame.

5. Movement magnifying mechanism, comprising the combination with an object the movement of which is to be magnified and a supporting member, of a roller having parts of different diameters, means tending to turn said roller, a saddle piece extending longitudinally of said roller and attached thereto, and flexible bands attached to said saddle piece so as to wind on said parts of the roller respectively from opposite directions, the bands being so disposed as to be put in tension by said turning means and being attached respectively, one to the supporting member, and the other to the object the movement of which is to be magnified.

6. Movement magnifying mechanism, comprising in combination with a supporting member and an object the movement of which is to be magnified, a roller having parts of different diameters placed eccentrically with respect to each other, flexible connecting members attached to the roller and adapted to wind on said parts of the roller respectively from opposite directions, said connecting members being attached, one to the supporting member and the other to the object the movement of which is to be magnified, means for counterbalancing the tendency of the connecting members to turn the axis of the roller, and means for adjusting the roller circumferentially so as to bring said connecting members into tangential relation with different parts of the circumference of the roller.

7. Movement magnifying mechanism, comprising in combination with a supporting member and an object the movement of which is to be magnified, a seat upon the supporting member, a roller having parts of different diameters, flexible connecting members attached to the roller and arranged to wind upon said parts of different diameters respectively from opposite directions, resilient means adapted to place said connecting members in tension and to urge the roller toward said seat, and means for counterbalancing the tendency of the connecting members to turn the axis of the roller.

8. Movement magnifying mechanism, comprising in combination with a supporting member and an object the movement of which is to be magnified, a seat on said supporting member, a roller having parts of different diameters, flexible connecting members attached to the roller so as to wind on said parts respectively, from opposite directions, means for placing said connecting members in tension, and means for counterbalancing the tendency of said connecting members to turn the axis of the roller, one of said connecting members extending in the plane of said seat and being attached to the supporting member and the other of said members being attached to the object the movement of which is to be magnified and extending at such an angle to said seat that the connecting members pull the roller toward the seat.

9. Movement magnifying mechanism, comprising the combination with an object the movement of which is to be magnified, of a frame having a seat thereon, a roller having parts of different diameter, a flexible band having one of its ends attached to said frame and the other of its ends attached to said roller so as to wind on one of said parts of said roller, said band extending in the plane of the surface of said seat, a second flexible band having one of its ends attached to the object the movement of which is to be magnified, said second band extending at an angle to the surface of said seat passing around the other of the parts of the roller and being attached to the roller, and a spring tending to turn the roller so as to put said bands in tension and to press the roller against said seat.

10. Movement magnifying mechanism, comprising the combination with an object the movement of which is to be magnified, of a frame having a seat thereon, a roller having parts of different diameters, flexible bands adapted to wind upon said parts of the roller respectively from opposite directions, one being attached to said frame and extending in the plane of the surface of said seat, and the other being attached to the object the movement of which is to be magnified and extending at an angle to the surface of said seat, means tending to turn the roller so as to place said bands in tension and means for attaching each of said bands to the roller, such means comprising an element to which each band is attached and which is urged toward the roller by the tension of the bands.

11. Movement magnifying mechanism, comprising in combination with a supporting member and an object the movement of which is to be magnified, a seat upon the supporting member, a roller having two end parts of equal diameter and a middle part of a different diameter, a flexible band attached to the roller so as to wind on the middle part thereof from one direction, a pair of flexible bands attached to the roller so as to wind on the end parts thereof from the other direction, said band and said pair of bands being attached respectively, the one to the supporting member and the other to the object the movement of which is to be magnified, and resilient means tending to urge the roller toward the seat.

12. Movement magnifying mechanism, comprising a frame, a bar slidable axially in said frame, seats on said frame in a plane inclined to the axis of said bar, a roller having end parts of the same diameter and a central part of different diameter, a pair of flexible bands attached to the frame and to said end parts of the roller, a flexible band having one end attached to said bar passing around the central portion of said roller and attached thereto, and a spring attached to the other end of said band and tending to turn said roller and to press said roller and said pair of bands against said seats.

13. Movement magnifying mechanism, comprising a frame, a bar slidable axially in said frame, seats on said frame in a plane inclined to the axis of said bar, a roller having end parts of the same diameter and a central part of different diameter, a pair of flexible bands attached to the frame and to the roller so as to wind upon said end parts, a flexible band having one end attached to said bar passing around the central portion of said roller and attached to the roller, a spring attached to the other end of said band and tending to turn said roller and to press said roller and said pair of bands against said seats, and means whereby the position of the points of attachment of said bands to the roller may be changed along the circumference of the roller.

14. Movement magnifying mechanism, comprising a frame, a bar slidable axially in said frame, a seat on said frame inclined to the axis of said bar, a roller having parts of different diameters, flexible bands, one attached to said bar and one attached to said frame and extending in the plane of the surface of said seat, adapted to wind upon said roller from opposite directions, and means for attaching said bands to the roller, such means being adjustable circumferentially of the roller.

15. Movement magnifying mechanism, comprising in combination a supporting member and an object the movement of which is to be magnified, a roller having end parts of the same diameter and the middle part of a different diameter, a member extending longitudinally of the roller along one side thereof, a flexible connecting member attached to said longitudinal member and arranged to wind upon the middle part of the roller from one direction, a pair of flexible connecting members attached to the longitudinal member at equal distances from the point of attachment of said first-mentioned connecting member and adapted to wind upon the end portions of the roller from the opposite direction, said connecting member and said pair of connecting members being attached respectively to the supporting member and the object the movement of which is to be magnified, and means for placing said connecting members in tension so as to draw said longitudinal member toward the roller.

16. Movement magnifying mechanism, comprising a frame, a scale upon said frame, a bar slidable axially in said frame and having a gauging point extending from the frame, a roller having parts of different diameters, flexible bands attached to said parts of the roller respectively so as to wind on said parts from opposite directions, one of said bands being attached to the frame and the other to the bar, means tending to turn the roller so as to place said bands in tension, and a pointer attached to said roller and having an end adjacent to said scale, said scale and the end of said pointer being at the end of the frame from which said gauging point projects.

WILLIAM TAYLOR.